Dec. 9, 1969 H. G. FEISSEL 3,483,533

MEMORY ELEMENTS COMPRISING A PLANE ANISOTROPIC THIN MAGNETIC FILM HAVING ISOTROPIC MAGNETIC LAYERS PROVIDING STABLE DOMAIN EDGES

Filed Nov. 20, 1967 6 Sheets-Sheet 1

Inventor:
Henri Gerard Feissel
BY Baldwin Wight Diller & Brown
Attorneys

Inventor:
Henri Gerard Feissel
BY Baldwin Wight Diller & Brown
Attorneys

Dec. 9, 1969 H. G. FEISSEL 3,483,533

MEMORY ELEMENTS COMPRISING A PLANE ANISOTROPIC THIN MAGNETIC FILM HAVING ISOTROPIC MAGNETIC LAYERS PROVIDING STABLE DOMAIN EDGES

Filed Nov. 20, 1967 6 Sheets-Sheet 3

Inventor:
Henri Gerard Feissel
By Baldwin Wight Diller & Brown
Attorneys

Inventor:
Henri Gerard Feissel
BY Baldwin Wight Diller & Brown
Attorneys

Inventor:
Henri Gerard Feissel
By Baldwin Wight Diller & Brown
Attorneys

Dec. 9, 1969 H. G. FEISSEL 3,483,533

MEMORY ELEMENTS COMPRISING A PLANE ANISOTROPIC THIN MAGNETIC FILM HAVING ISOTROPIC MAGNETIC LAYERS PROVIDING STABLE DOMAIN EDGES

Filed Nov. 20, 1967 6 Sheets-Sheet 6

Inventor:
Henri Girard Feissel
BY Baldwin Wight Diller & Brown
Attorneys

United States Patent Office 3,483,533

Patented Dec. 9, 1969

3,483,533

MEMORY ELEMENTS COMPRISING A PLANE ANISOTROPIC THIN MAGNETIC FILM HAVING ISOTROPIC MAGNETIC LAYERS PROVIDING STABLE DOMAIN EDGES

Henri Gerard Feissel, Paris, France, assignor to Societe Industrielle Bull-General Electric (Societe Anonyme), Paris, France Filed Nov. 20, 1967, Ser. No. 684,323
Claims priority, application France, Nov. 30, 1966, 85,624
Int. Cl. G11b *5/00*
U.S. Cl. 340—174 3 Claims

ABSTRACT OF THE DISCLOSURE

A memory element wherein that portion of the magnetic film in which there is formed a magnetic domain under the action of control currents flowing through the control conductors is provided at its ends, in the direction of easy magnetisation, with relatively large magnetic poles, formed by magnetically isotropic magnetic layers.

Figure 1:
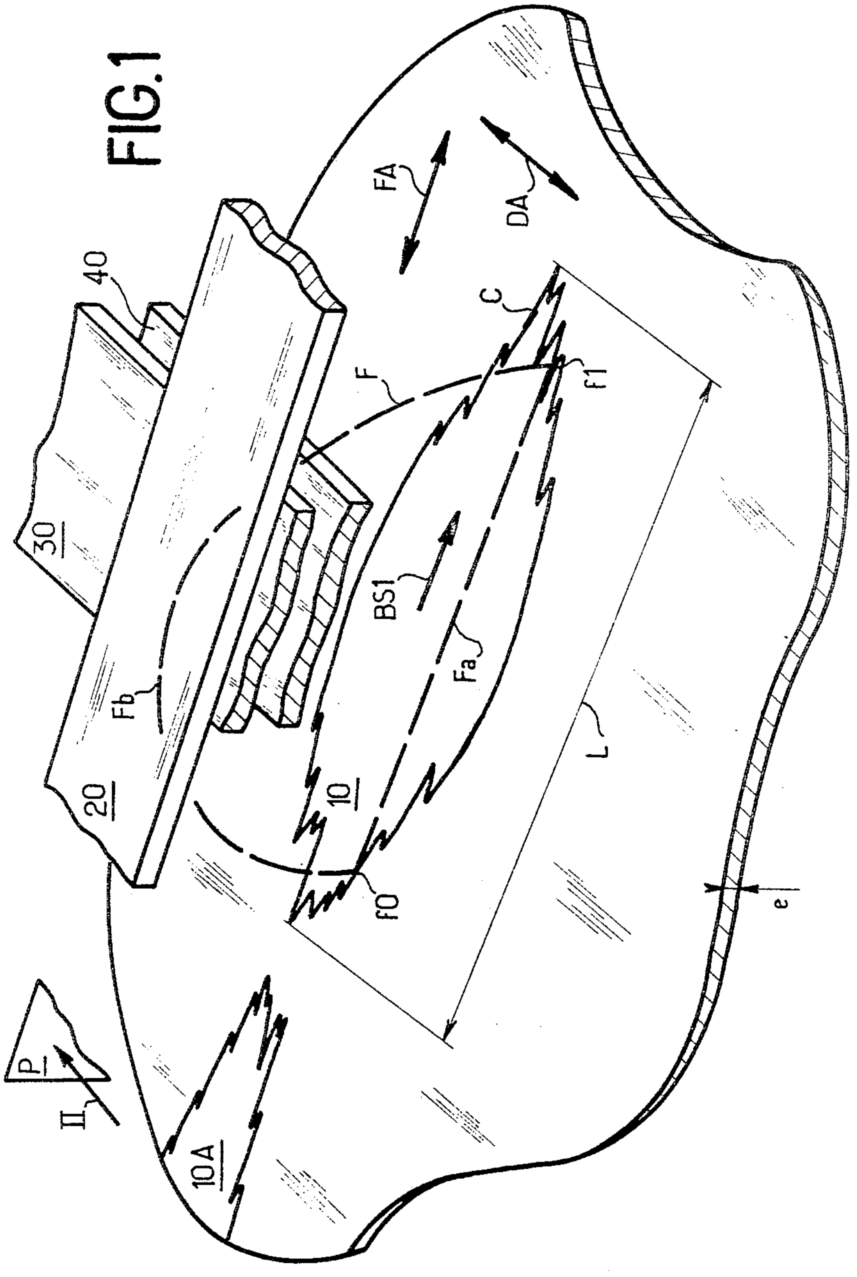

This invention concerns memory elements comprising a plane anisotropic thin magnetic film having open magnetic circuits.

The recoding medium of a memory element of this type is a plane element consisting of a thin magnetic film which has in its plane a direction of preferred magnetisation, called the direction of easy magnetisation, and a direction of difficult magnetisation perpendicular to the direction of easy magnetisation, and in which, in response, to a particular control action, there is formed a magnetic domain magnetised in this direction of easy magnetisation, the said domain constituting the recording of a data element and the direction of the residual induction in this domain representing the value of the data element and depending upon certain characteristics of the said control action.

The control device of a memory element of this type consists of two electric control conductors, usually in tape form, which are disposed along the magnetic film element so that their orthogonal projections on to the plane of the magnetic film element are perpendicular to the direction of easy magnetisation and to the direction of difficult magnetisation respectively.

An electric reading conductor, usually in tape form, which is disposed along the magnetic film element perpendicularly to the direction of easy magnetisation, permits of collecting reading signals in response to particular control actions carried out under particular conditions.

The control action by means of which the magnetic domain can be formed results from the passage, at particular instants, of control currents of appropriate value through the two control conductors, the direction of the current in the conductor perpendicular to the direction of easy magnetisation determining the direction of the magnetisation in the damain thus formed.

The contour of the magnetic domain has the form of a spherical lune whose longitudinal axis is parallel to the direction of easy magnetisation and this contour is finely serrated. For the reasons indicated in the following, this contour is not stable, and nor is the domain. The lines of force of the magnetic field due to the residual induction in the magnetic domain under consideration issue from the magnetic film element through either one of the faces of the latter along this contour, or in the immediate neighbourhood thereof, so as to penetrate into the non-magnetic medium adjacent the magnetic film element along each face thereof. These lines of force issue from the film element through narrow bands of its faces which bound the contour of the domain and the width of which scarcely exceeds a few hundred angstroms. These bands constitute the polar surfaces of the magnetic film element, and the value of the magnetic induction on these polar surfaces, which are of small dimensions, is high.

The contour of the domain is not stable because it is such that, at any point of the domain, the demagnetising field is lower than the coercive field and because, along the wall of the domain, the demagnetising field is equal to the coercive field. Consequently, any external action which brings about a magnetic field on the wall of the domain destroys the existing equilibrium and produces a modification of the contour such that the above-indicated conditions are again satisfied. This may result in the complete disappearance of the domain and of the data recoding constituted by this domain, or in such an increase of the dimensions of the domain that the operation of the device comprising the memory element is disturbed.

In known devices employing a series of memory elements of the type under consideration, each magnetic domain constituting a data recording in a memory element creates around it, by reason of the extent of the magnetic induction on its polar surfaces, a parasitic magnetic field whose value in the neihbouring memory elements is appreciable. It is then necessary to space apart the memory elements or to insulate them appropriately from one another, and this involves a limitation of the density of the memory elements in these devices.

In order to avoid the aforesaid disadvantages, it is necessary to limit to an appropriate value the demagnetising field in the magnetic domain constituting the data recording in the memory elements under consideration. This necessitates an upper limit for the thickness of the magnetic film and for its length in relation to the thickness of the magnetic domain, and consequently a lower limit for the length of the magnetic domain for the admissible maximum value of the thickness of the magnetic film.

If the reading signal supplied by a memory element designed to satisfy these conditions is too weak to be appropriately utilised, it is necessary to increase the width of the control conductors while at the same time increasing the control currents so as to form a domain of larger dimension in which the useful magnetic flux is increased.

The conditions indicated in the above paragraph lead to raising the lower limit imposed by the previously indicated conditions on the dimensions of the magnetic film element constituting the recording medium of the memory element of the type under consideration. Hence, in the present state of the art, magnetic domains are formed whose length is rarely less than 1 mm., the thickness of the magnetic film generally not exceeding 1000 angstroms. In the devices utilising a series of memory elements of the this type, it is necessarily to limit the density of the member elements in order to satisfy the same conditions.

In conclusion, in the construction of memory elements of the type under consideration and of devices comprising a series of memory elements of this type, it is necessary to take account of the fact that the reading signal, the currents and the dimensions of the memory elements are characteristics whose values cannot be chosen independently of one another, and that the choice of compatible values for these three characteristics constitutes a compromise because the choice of a more favourable value for one of the characteristics under consideration necessitates the choice of a less favourable value for at least one of the other two.

One object of the present invention is to modify in a favourable sense the conditions which necessitate the adoption of such a compromise in the construction of memory elements of the type under consideration and of devices, such as matrix memories, in which a series of memory elements of this type is employed.

More particularly, the invention has for its object to make is possible to construct memory elements comprising a plane anisotropic thin magnetic film having open magnetic circuits, in which the demagnetising field is lower than that which is set up in the known memory elements of the type under consideration.

The invention also has for its objects to permit the construction of devices utilising a series of memory elements of the type under consideration, such that the parasitic magnetic field created by each of the memory element in the neighbouring elements is reduced.

In accordance with the invention, advantage is taken of the fact that a portion of anisotropic thin magnetic film at least partially loses its properties of magnetic anisotropy when it is covered by a sufficiently thick layer of magnetically isotropic magnetic substance.

The invention relates to a memory element comprising as recording support an anisotropic thin magnetic film which has in its plane a direction of easy manipulation and a direction of difficult magnetisation perpendicular to the direction of easy magnetisation, this memory element comprising in addition a first electric conductor disposed along the magnetic film in such manner that the projection of its longitudinal axis on to the magnetic film, perpendicularly to the said plane, is perpendicular to the direction of easy magnetisation, and a second electric conductor disposed along the magnetic film in such manner that the projection of its longitudinal axis on to the magnetic film, perpendicularly to said plane, is perpendicular to the direction of difficult magnetisation. A memory element according to the invention is characterised in that it comprises two layers of a magnetically isotropic magnetic substance, the said layers being disposed, respectively, along two portions of the magnetic film situated on the said projecion of the longitudinal axis of the second conductor, on either side of the said projection of the longitudinal axis of the first conductor, the said layers being in contact with the said portions of the magnetic film, or being disposed ata very short distance therefrom, and the surfaces of contact, or the opposite surfaces of the said portions of the magnetic film and of the said magnetic layers, having an area which is very much greater than that of any cross-section, along a plane perpendicular to the direction of easy magnetisation of that part of the magnetic film which is comprised between the said portions of the magnetic film, so that the magnetic circuit portion formed by the magnetic film and the said magnetic layers has on the same side of the magnetic film as the first conductor, polar surfaces of large dimension in order to offer low reluctance to the magnetic flux extending around the first conductor, which magnetic flux is due either to the passage of a control current through the said first conductor or to the existence of a magnetic domain magnetised in the direction of easy magnetisation and occupying in the magnetic film the said part comprised between the said portions of the magnetic film, and in order that, when the said magnetic domain is present, the magnetic induction along this polar surface may be very much lower than the residual induction in the magnetic domain.

As a result of the features of the invention, the demagnetising field in the magnetic domain is considerably reduced and, in devices in which a series of memory elements according to the invention is utilised, the parasitic magnetic field which is generated by one of these memory elements in the neighbouring elements is also reduced.

The provision of magnetic layers in accordance with the invention constitutes a means of giving the domain a form of which is to a large extent independent of disturbances, and this means is more effective than the known means consisting in cutting up the magnetic film, because this does not in any way prevent the domain from being reduced under the effect of certain disturbances.

In addition, the memory elements according to the invention have, over known memory elements of the type under consideration, the following advantages.

The reading signal may be appreciably increased, under otherwise equal conditions. On the one hand, the thickness of the magnetic film and the ratio of the thickness to the length of the domain constituting the data recording may be increased without the shape or the dimension of the domain being likely to vary detrimentally during the operation of the memory element. On the other hand, the provision of polar surfaces of large dimension situated on the same side of the magnetic film as the reading conductor, in accordance with the invention, has the effect of reducing the reluctance to the magnetic flux set up in that portion of the ambient space which is situated on this side of the plane. Consequently, the useful flux, i.e. the flux extending around the reading conductor, is higher than in the case of the known memory elements.

Independently of the fact that the reading signal may be increased, it is possible by means of the provision of the invention to utilise weaker control currents in the memory elements under consideration, since the provision of polar surfaces of large dimension on the same side of the magnetic film as a conductor, in accordance with the invention, has the effect of reducing the reluctance offered by that magnetic circuit portion which is formed by the magnetic film and the magnetic layers to the magnetic flux resulting from a control current passing through this conductor. It is then possible to utilise weaker currents in the conductor under consideration in order to obtain the appropriate magnetic induction in the magnetic film element.

In addition, in devices in which a series of memory elements according to the invention is utilised, the disturbances produced by the control currents relative to one element on the neighbouring elements are reduced owing to the aforesaid reduction of reluctance.

Another advantageous consequence of this reduction of reluctance is that, in the memory elements according to the invention, it is possible to increase the tolerances on the position, the shape and the dimensions of the control and reading conductors around which there extends the magnetic flux which is opposed by the reluctance under consideration.

In order to obtain advantageous characteristics in respect of the control currents regardless of the control conductor under consideration, the memory element may, in accordance with the invention, be provided with such layers of magnetic substances on either side of a first conductor intended to pass control currents perpendicularly to the direction of easy magnetisation, and on either side of a second conductor intended to pass control currents perpendicularly to the direction of difficult magnetisation, gaps being provided between these layers in order to avoid the creation, along the edges of the magnetic domain formed by the control currents, of closed magnetic circuits of low reluctance which would detrimentally reduce the coupling of the magnetic film element to the conductors associated with this element.

It is known that it is possible to improve the operation of a known memory element of the type under consideration by disposing above the control and reading conductors of the said memory element a layer of magnetic substance which has the effect of reducing the reluctance of the magnetic circuits in which are set up the magnetic fluxes surrounding these conductors. The improvement obtained by this means is limited because the reluctance of the air gaps existing in the magnetic circuits under consideration remains high. By using the same means with a memory element according to the invention, the improvement obtained is rendered the more appreciable in proportion as the reluctance of the air gaps in question is reduced owing to the existence of the magnetic layers disposed in accordance with the invention.

Figure 2:
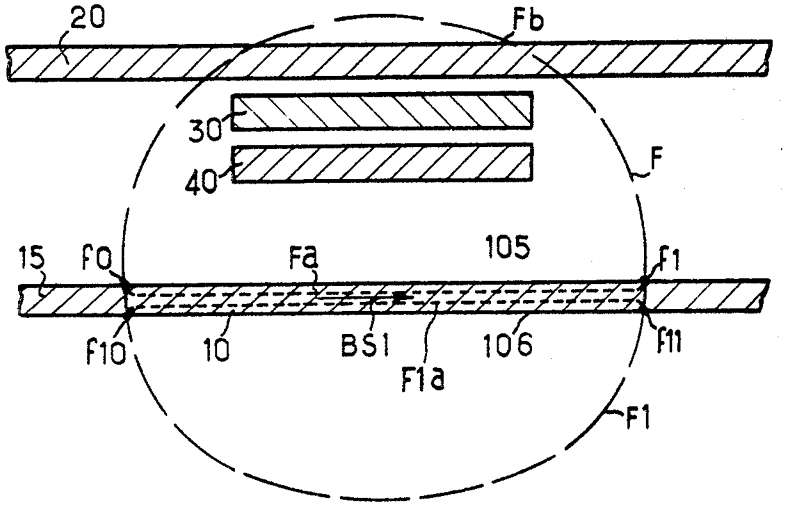
Figure 4:
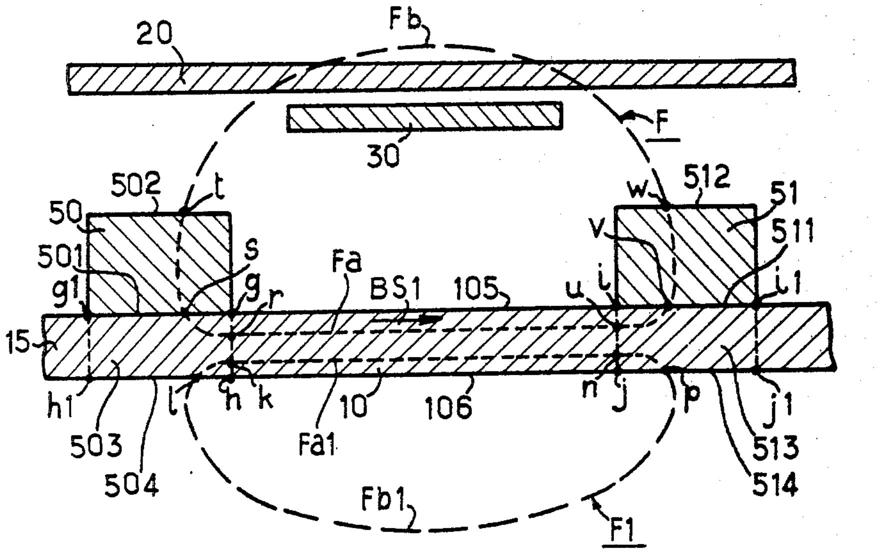
Figure 3:
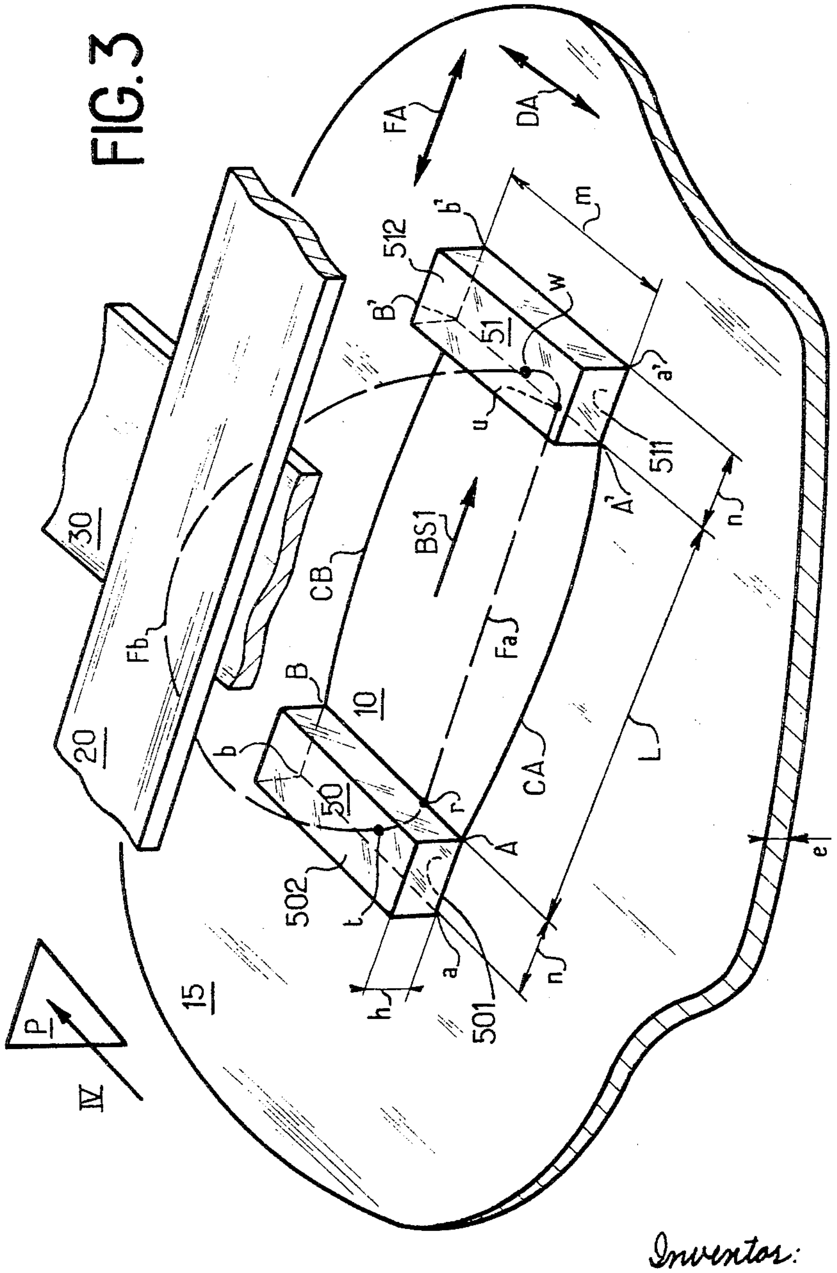

For a better understanding of the invention and to show how it may be performed, a number of embodiments of the invention will now be described, by way of example, with reference to the accompanying drawings, in which:

FIGURE 1 illustrates in perspective a known memory element of the type under consideration, FIGURE 2 is a section along the plane P of the memory element illustrated in FIGURE 1, this section being seen in the direction II indicated in FIGURE 1, FIGURE 3 illustrates in perspective a first memory element according to the invention, FIGURE 4 is a section along the plane P of the memory element illustrated in FIGURE 3, this section being seen in the direction IV indicated in FIGURE 3, FIGURES 5, 6 and 7 illustrate in perspective a second, a third and a fourth memory element according to the invention.

The memory element of known type illustrated in FIGURES 1 and 2 comprises a portion 10 of an anisotropic plane thin magnetic film 15, electric control conductors 20 and 30 and a reading conductor 40.

The magnetic film 15 has in its plane a direction of easy magnetisation FA and a direction of difficult magnetisation DA perpendicular to the direction FA. Its thickness *e* is of the order of 500 angstroms and generally does not exceed 1000 angstroms.

The magnetic film portion 10, also referred to in the present specification as a magnetic film element, is that portion of the magnetic film 15 in which there is formed a magnetic domain magnetised in the direction FA, under the action of control currents of appropriate values which flow at particular instants through the control conductors 20 and 30. This portion 10 of the magnetic film is substantially concentric with the common portion of the orthogonal projections of the control conductors 20 and 30 on the plane of the magnetic film.

The control conductors 20 and 30, and the conductor 40, are disposed along a face 105 (FIGURE 2) of the magnetic film element 10 in planes parallel to this face, which is hereinafter referred to as the useful face of the magnetic film element for the conductors under consideration.

One of the control conductors 20 is perpendicular to the direction DA, while the other control conductor 30 and the reading conductor 40 are perpendicular to the direction FA.

It is to be noted that, in known manner, the control conductor 20 may be disposed along that face 106 (FIGURE 2) of the magnetic film element which is opposite to the face 105 along which the control conductor 30 and the reading conductor 40 are disposed. The face 106 is then the useful face for the conductor 20.

It is also to be noted that, in known manner, the conductors 30 and 40 may be replaced by a single conductor connected to appropriate circuits which enable this single conductor to be alternately employed as a control conductor and as a reading conductor. In the following, it is assumed that this is the case, and the single conductor thus employed will be denoted by the reference numeral 30.

The contour C of the domain has the general form of a spindle whose longitudinal axis is parallel to the direction FA. This contour is in fact finely serrated. This has been diagrammatically indicated in FIGURE 1. The length L of the domain is of the same order of magnitude as the width of the control conductor 30 which is perpendicular to the direction FA.

The domain under consideration, and consequently the contour C, may be modified to a certain extent under the effect of certain disturbances.

The magnetic film element 10 may take either one of two stable states corresponding respectively to the two equal values of opposite signs which may be taken by the residual induction in the magnetic domain in the direction FA. In FIGURES 1 and 2, there is represented by a vector BS1 the residual induction to which one of these stable states corresponds, and there has been represented by a chain line F a line of force of the magnetic field due to this residual induction. This line of force is contained in a plane P perpendicular to the plane of the magnetic film element 10 and parallel to the direction of the residual induction BS1.

FIGURE 2, which shows a section through the memory element along the plane P, will enable the characteristics of the line of force F to be more readily described.

In this FIGURE 2, the segments *f*0, *f*10 and *f*1, *f*11 are sections along the plane P of the wall of the domain. In this FIGURE 2, the magnetic film element constituting the recording medium of the memory element under consideration appears in the portion *f*0, *f*10, *f*11, *f*1 of the magnetic film 15.

That portion of the line of force F which is contained in the magnetic film element 10 comprises a rectilinear part F*a* contained in the domain, this part being parallel to the direction of the residual induction BS1, and parts situated on the section *f*0, *f*10 and *f*1, *f*11 respectively of the wall of the domain along the plane P, the latter parts terminating in the useful face 105 of the magnetic film element, at *f*0 and *f*1 respectively, along the contour of the domain. These points *f*0 and *f*1 are situated in the immediate neighbourhood of the contour C (FIGURE 1) of the domain, at a distance not exceeding a few hundred angstroms.

The parts F*b* of the line of force F which is situated outside the magnetic film in the surrounding space adjacent the useful face 105 of the magnetic film element 10 forms with the part contained in the magnetic film element a closed line around the reading conductor 40.

It is to be noted that the magnetic flux due to the residual induction in the magnetic domain and leaving the magnetic film, is distributed substantially symmetrically on either side of the plane of the latter. FIGURE 2 shows a line of force contained in the plane P and extending through that portion of space which is adjacent to the magnetic film element along the face 106 of the latter opposite to the useful face 105. This line of force represented in FIGURE 2 by a chain line F1 leaves the magnetic film element 10 at *f*10 and *f*11 on the face 106 of the latter along the contour of the domain.

Any line of force of the magnetic field considered which extends outside the magnetic film leaves the magnetic film element in the immediate neighbourhood of the contour of the domain, through either one or other of the faces of the magnetic film element, as in the case of the lines of force F and F1 illustrated in FIGURES 1 and 2. The polar surfaces of the magnetic film element therefore consist of narrow bands of the faces of this element situated along the contour of the domain. The value of the magnetic induction along these polar surfaces is similar to that of the residual induction BS1 in the element. This considerable value of the magnetic induction along the polar surfaces determines a demagnetising field of high value in the magnetic domain. In addition, it determines throughout the surrounding portion of the magnetic film a parasitic magnetic field of high value. In a device utilising a series of memory elements of the type under consideration such a parasitic field due to a magnetic film element, such as 10 in FIGURE 1, interferes with the operation of any memory element comprising as recording medium a neighbouring element such as 10A in FIGURE 1, of the same magnetic film.

The memory element according to the invention as illustrated in FIGURES 3 and 4 comprises, as does the memory element of known type illustrated in FIGURES 1 and 2, an anisotropic plane thin magnetic film element 10 and control and reading conductors which satisfy the conditions previously indicated with reference to the known memory element, i.e. for this purpose the conductors 20 and 30 disposed along the useful face 105 of the magnetic film element 10.

The magnetic film 15 has the previously indicated magnetic characteristics of that employed in the known memory element illustrated in FIGURES 1 and 2. On the other hand, the thickness of the magnetic film may be greater than that found in known memory elements, and it may be of the order of 3000 angstroms. The magnetic film element 10 is that portion of the magnetic film 15 in which there is formed a magnetic domain magnetised in the direction FA under the action of control currents of appropriate value which pass at particular instants through the control conductors 20 and 30. This portion 10 of the magnetic film is substantially concentric with the common portion of the orthogonal projections of the control conductors 20 and 30 onto the plane of the magnetic film. The vector BS1 (FIGURES 3 and 4) represents one of the two equal values of opposite signs which may be taken by the residual induction in the magnetic domain in the direction of easy magnetisation FA.

In accordance with the invention, leaves 50 and 51 of a magnetically isotropic magnetic substance are disposed respectively along two portions 503 and 513 (FIGURE 4) of the magnetic film 15 on the orthogonal projection of the conductor 20 on to the plane of the magnetic film element 10, on either side of the orthogonal projection of the longitudinal axis of the conductor 30 on to this plane.

The thickness *h* (FIGURE 3) of the magnetic layers 50 and 51 is of the same order of magnitude as, or greater than, the thickness *e* of the magnetic film 15. It may be of the order of 10,000 angstroms.

The face 501 of the magnetic layer 50 and the face 511 of the magnetic layer 51 are disposed along the useful face 105 of the magnetic film. They are in direct contact with the useful face 105 of the magnetic film, or they are separated therefrom by an air gap which offers only low reluctance to the magnetic flux set up through the opposite surfaces of the magnetic layers 50 and 51 and of the portions 503 and 513 of the magnetic film 15. These faces 501 and 511 are rectangles, i.e. AB*ba* and A'B'*b'a'* respectively, of which the larger side and the smaller side are perpendicular and parallel respectively to the direction FA and have the dimensions *m* and *n* respectively, *n* being very much greater than the thickness *e* of the magnetic film and possibly being of the order of 100 microns.

The choice of *m* is limited only by technological considerations and by the choice of certain characteristics of the device in which the memory element is incorporated. For example, when the values *e* and *n* have been chosen, the choice of *m* determines the value of the reading signal and that of the control currents in the conductor 20, these values then being as a first approximation proportional to *m*.

The sides AB and A'B' of the faces 501 and 511 of the magnetic layers 50 and 51 are symmetrical with one another about the orthogonal projection on to the plane of the magnetic film element 10 of the longitudinal axis of the conductor 30.

The distances between the layers 50 and 51, i.e. the dimension L (FIGURE 3) which may be given to the magnetic domain by the application of the invention, may be appreciably reduced and its lower limit is fixed only by technological considerations and by the choice of certain characteristics of the device in which the memory element is incorporated.

The face 502 of the magnetic layer 50 and the face 512 of the magnetic layer 51 are the faces parallel and opposite to the faces 501 and 511 respectively. The portions 503 and 513 of the magnetic film 15, along with the magnetically isotropic magnetic layers such as 50 and 51 are disposed in the manner indicated in the foregoing, do not act in the same way as the remainder of the magnetic film. Their magnetic anisotropic properties are attenuated by an action exerted thereon by these magnetic layers by reason of their proximity. The magnetic induction in these portions of the magnetic film may take any orientation. It is then possible, under the action of control currents of appropriate value passing at predetermined instants through the conductors 20 and 30, to form in the magnetic film element as magnetic domain magnetised in the direction of easy magnetisation FA, which occupies the interval between the magnetic layers 50 and 51. The magnetic flux resulting from the existence of this domain and extending outside the magnetic film comprises two parts. One parts of this magnetic flux extends through the half-space adjacent the useful face 105 of the magnetic film, this part of the magnetic flux appearing mainly through the faces 502 and 512 of the magnetic layers 50 and 51, while the other part of the said magnetic flux extends through the half-space adjacent the opposite face 106 of the magnetic film, this part of the magnetic flux appearing through the faces 504 and 514 (FIGURE 4) of the portions 503 and 513 of the magnetic film. That portion of the magnetic circuit which is formed by the magnetic film 15 and the magnetic layers 50 and 51 therefore comprises, in the first half-space considered, polar surfaces 502 and 512, and in the second half-space considered polar surfaces 504 and 514.

Owing to the features of the invention, the magnetic domain formed under the above-indicated conditions has an approximately rectangular contour which comprises, at those of its ends at which the magnetic layers 50 and 51 respectively are situated, the sides AB and A'B' of the faces 501 and 511 of these magnetic layers.

Between these ends, the contour comprises lines CA and CB which deviate little from the straight lines joining A to A' and B to B' respectively.

The area of any cross-section of the domain along a plane perpendicular to the direction of easy magnetisation FA therefore has approximately the value $m \times e$. This value is very much lower than that $m \times n$ of the area of the polar surfaces 501, 512, 504 and 514 of that portion of the magnetic circuit which is formed by the magnetic film 15 and the magnetic layers 50 and 51. The magnetic induction along these polar surfaces is consequently very much lower than the residual induction BS1 existing in the magnetic domain, and therefore the demagnetising field in the magnetic domain is weak. In addition, in a device such as a matrix memory comprising a series of memory elements according to the invention and utilising a magnetic film common to the various memory elements, the parasitic magnetic field generated by one of these memory elements in the neighbouring element is reduced.

In order that the characteristics of the magnetic field due to the residual induction BS1 in the magnetic domain may be more readily understood, there is represented in FIGURES 3 and 4 by a chain line F a line of force of this magnetic field surrounding the conductor 30. This line of force is contained in a plane P perpendicular to the plane of the magnetic film element 10 and parallel to the direction of the residual induction BS1.

In FIGURE 4, the segments *gh* and *ij* represent the cross-sections through the wall of the domain along the plane P. In this FIGURE 4, the magnetic film element 10 constituting the recording medium of the memory element under consideration appears in the portion *ghji* of the magnetic film 15.

That part F*a* of the line of force F which is contained in the magnetic domain is rectilinear and parallel to the direction of the residual induction BS1; it reaches the wall of the domain at *r* and *u*.

That portion of the line of force F which is outside the magnetic domain comprises parts *rs* and *st* contained in the magnetic film 15 and the magnetic layer 50 respectively, parts *uv* and *vw* contained in the magnetic film 15 and in the magnetic layer 51 respectively, and a part F*b* contained in that portion of the space which is adjacent to the magnetic film 15 and to the magnetic layers 50 and 51, on the same side of the magnetic film element 10 as the conductor 30.

If any lines of force of the magnetic field under consideration are traced which extend through that portion of the space which is situated on the same side of the magnetic film as the conductor 30, the majority of the lines of force which can thus be traced extend through the faces 502 and 512 of the magnetic layers 50 and 51 respectively. As has previously been indicated, these faces 502 and 512 constitute, in the portion of space under consideration, the polar surfaces of that portion of the magnetic circuit which is formed by the magnetic film and the magnetic layers 50 and 51.

FIGURE 4 shows a line of force F1 contained in the plane P and extending through the space adjacent the magnetic film along that face 106 of the latter which is opposite to the useful face 105. That part F*a*1 of this line of force which is contained in the magnetic domain is rectilinear and parallel to the direction of the residual induction BS1; it reaches the wall of the domain at *k* and *n*. That portion of the line of force F1 which is outside the magnetic domain comprises parts *kl* and *np* in the portions 503 and 513 of the magnetic film 15, and a part F*b*1 contained in the portion of space adjacent the magnetic film along the face 106 of the latter. The parts *kl* and *np* of the line of force reach the face 106 of the magnetic film within the projections 504 and 514 of the magnetic layers 50 and 51 on to this face 106. These projections 504 and 514 which have the same dimensions as the faces 502 and 512 of the magnetic layers 50 and 51, constitute the polar surfaces of the magnetic circuit portion which is formed by the magnetic film 15 and the magnetic layesr 50 and 51, for the magnetic flux resulting from the residual induction BS1 and extending through the portion of space adjacent the magnetic film along the face 106 of the latter.

As has just been seen, the magnetic flux due to the residual induction in the magnetic domain and leaving the magnetic film is distributed substantially equally on either side of the latter. The magnetic layers 50 and 51 in fact introduce only a slight lack of symmetry as long as the ratio of their thickness *h* to the distance L separating them is great.

A memory element according to the invention may therefore be constructed by disposing the control and reading conductors 20 and 30 on that side of the magnetic film which is opposite to that along which the magnetic layers 50 and 51 are disposed.

The memory elements according to the invention may be produced by first depositing the thin anisotropic film 15, then the magnetically isotropic magnetic layers 50 and 51, and finally the electric conductors 20 and 30. The arrangement illustrated in FIGURES 3 and 4 is thus obtained.

Having regard to the preceding observation concerning the relative positions of the conductors with respect to the magnetic film, the memory elements according to the invention may also be produced by first depositing the magnetically isotropic magnetic layers, then the thin anisotropic magnetic film and finally the electric conductors.

Figure 5:
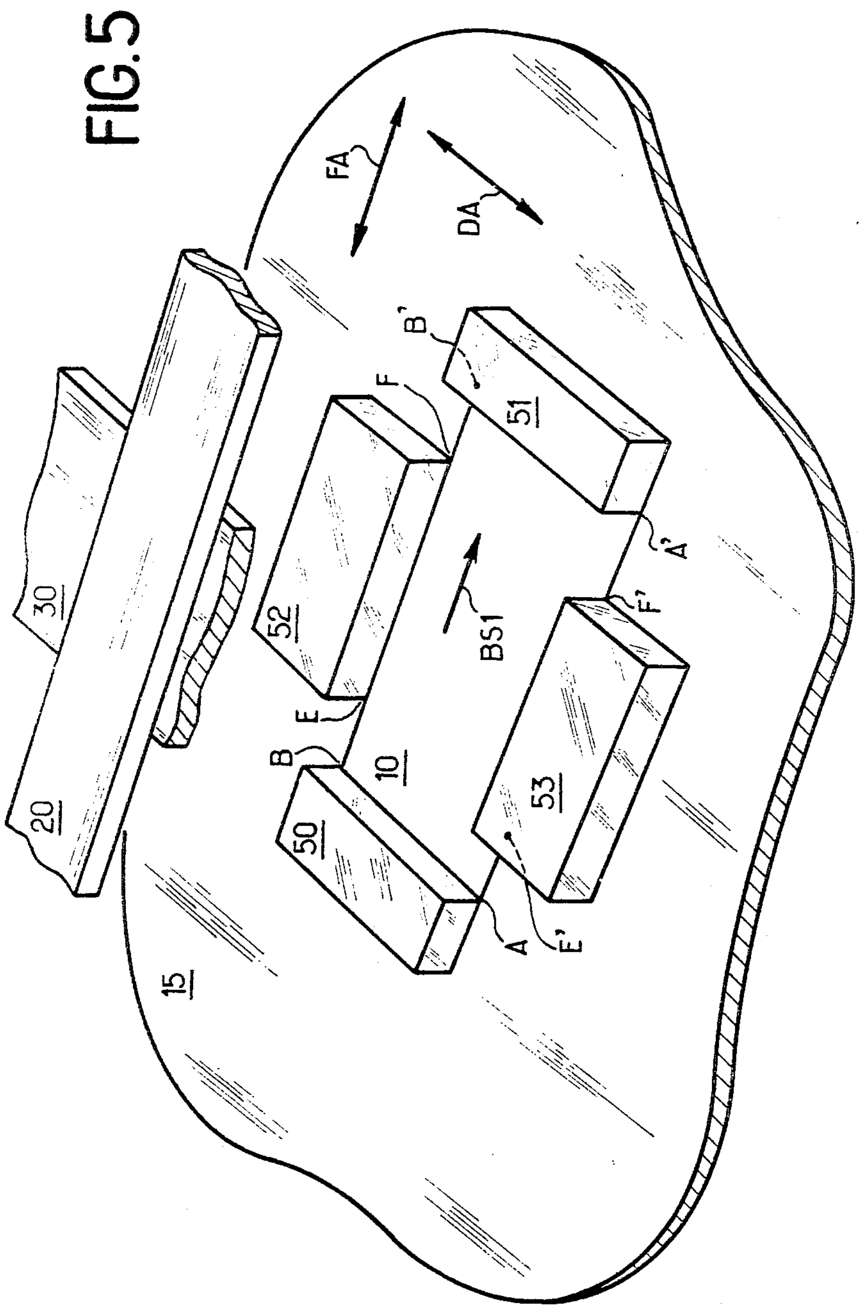

The memory element according to the invention as illustrated in FIGURE 5 comprises, in the same way as the memory element illustrated in FIGURES 3 and 4, a magnetic film element 10, layers of magnetic substance 50 and 51 and electric conductors 20 and 30, these component elements satisfying the conditions previously indicated with regard to the memory element illustrated in FIGURES 3 and 4.

The memory element illustrated in FIGURE 5 comprises in adition layers 52 and 53 of a magnetic substance having the previously indicated characteristics of the magnetic layesr 50 and 51. These magnetic layers 52 and 53 are disposed on either side of the orthogonal projection of the longitudinal axis of the conductor 20 on to the plane of the magnetic film element 10. The arrangement is such that the sides EF and E'F' of that face of these magnetic layers which rests on the magnetic film are parallel to this projection and are symmetrical with one another about this projection.

Each of the magnetic layers 52 and 53 is disposed on the magnetic film 15 in such manner as to form therewith a magnetic circuit portion offering low reluctances to the magnetic flux which extends around the conductor 20 during the passage of a control current through this conductor.

Gaps separate the magnetic layers 50, 51, 52 and 53 from one another so that these layers may not form on the edges of the magneitc domain formed in the magnetic film element 10 closed magnetic circuits of low reluctance which would disturb the action of the control currents and through which the greater part of the magnetic flux due to the residual induction in the magnetic domain would be set up, which would prevent appropriate coupling of the magnetic film element to the control and reading conductors associated with this element.

The magnetic layer 50 and 51 produce the same effects in the memory element illustrated in FIGURE 5 as in the memory element illustrated in FIGURE 3 and 4. More particularly, the magnetic domain which is formed in the magnetic film under the action of the control current has approximately the same contour as that formed in the memory element illustrated in FIGURES 3 and 4.

The presence of the magnetic layers 52 and 53 in the memory element illustrated in FIGURE 5 has the results indicated in the following paragraphs.

The magnetic flux which extends through the magnetic film element 10 during the passage of a control current through the conductor 20 represents a greater fraction of the total magnetic flux due to this current than if the magnetic film were not provided with the magnetic layers 52 and 53. It is then possible to use a weaker control current in the conductor 20 in order to obtain the desired magnetic induction in the magnetic film element 10.

In anddition, in devices employing a series of memory elements according to FIGURE 5, the magnetic flux which extends through neighbouring magnetic film elements represents a smaller fraction of the total magnetic flux due to the control currents passing through the conductor 20. The disturbances produced by such a control current relative to a memory element on the neighbouring elements are therefore smaller in devices employing the memory elements according to FIGURE 5 than in devices employing memory elements according to FIGURES 3 and 4.

The invention is not limited to the case where the magnetic film 15 extends beyond the contour of the magnetic domain as illuserated in FIGURES 3 to 5. More particularly, the invention also includes devices such as matrix memories employing a series of memory elements according to the invention and comprising a magnetic film common to the various memory elements as well as those in which the magnetic film is cut up to isolate each memory element.

Figure 6:
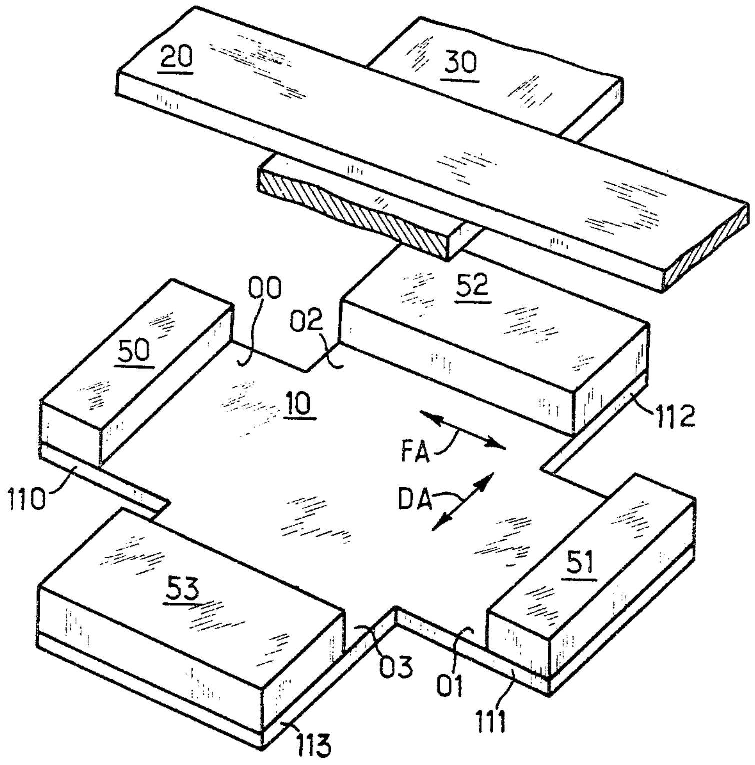

FIGURE 6 shows a memory element according to the invention which comprises, like that illustrated in FIGURE 5, four layers of a magnetically isotropic magnetic substance 50, 51, 52 and 53, which are disposed in like manner. The memory element illustrated in FIGURE 6 is distinguished from that illustrated in FIGURE 5 in that the magnetic film element 10 which it comprises is cut into the form of a cross having four arms, of which two 00 and 01 are parallel to the direction of easy magnetisation FA, and of which the other two 02 and 03 are parallel to the direction of difficult magnetisation DA. The four magnetic layers 50, 51, 52 and 53 are disposed along the ends 110, 111, 112 and 113 of the arms 00, 01, 02 and 03 respectively. The cutting of the magnetic film element into the form of a cross makes it possible to avoid a disadvantage of the memory element illustrated in FIGURE 5, since in the latter, when a magnetic domain is present in the magnetic film element, a portion of the magnetic flux due to the residual induction in the domain extends through the magnetic film along the edges of this domain, whereby the coupling between the magnetic film element and the reading conductor is reduced.

The invention is not limited to the particular number and shape of the magnetic layers disposed along the magnetic film so as to bound the location which must be occupied by the magnetic domain constituting a data recording. Thus, in order to reduce the inductance of the control circuits by an increase of the reluctance presented to the magnetic flux extending around the conductors through the said magnetic layers, the latter may be so cut as to impart thereto an anisotropy of form which has the effect of increasing this reluctance.

Figure 7:
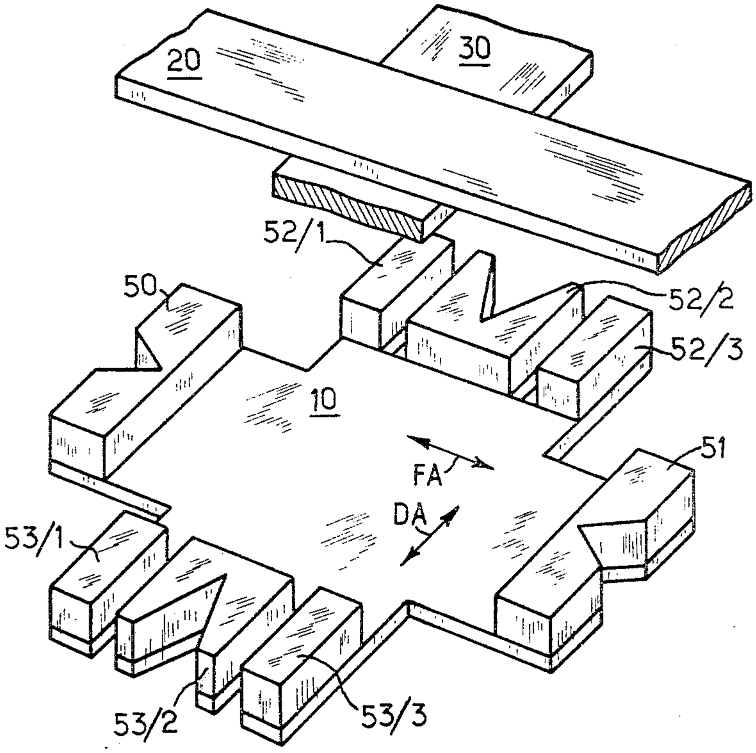

FIGURE 7 shows, for example, a memory element according to the invention which differs from that of FIGURE 6 in that the magnetic layers 50, 51, 52 and 53 have been cut to produce the indicated effect. Thus, the magnetic layers 52 and 53 have each been subdivided into three parts, namely 52/1, 52/2, 52/3 on the one hand, and 53/1, 53/2 and 53/3 on the other hand.

What is claimed is:

1. A memory element comprising as recording support an anisotropic plane thin magnetic film which has in its plane a direction of easy magnetisation and a direction of difficult magnetisation perpendicular to the direction of easy magnetisation, this memory element comprising in addition a first electric conductor disposed along the magnetic film in such manner that the projection of its longitudinal axis on to the magnetic film, perpendicularly to the said plane, is perpendicular to the direction of easy magnetisation, and a second electric conductor disposed along the magnetic film in such manner that the projection of its longitudinal axis on to the magnetic film perpendicularly to the said plane, is perpendicular to the direction of difficult magnetisation, said memory element being characterised in that it comprises two layers of a magnetically isotropic magnetic substance, the said layers being disposed in planes parallel to the plane of the magnetic film, respectively along two portions of the magnetic film situated on the said projection of the longitudinal axis of the second conductor, on either side of the said projection of the longitudinal axis of the first conductor, the said layers being in contact with the said portions of the magnetic film, or being disposed at a very short distance therefrom, and the surfaces of contact, or the opposite surface of the said portions of the magnetic film and of the said magnetic layers, having an area which is very much greater than that of any cross-section, along a plane perpendicular to the direction of easy magnetisation, of that part of the magnetic film which is comprised between the said portions of the magnetic film.

2. A memory element according to claim 1, further comprising two other layers of a magnetically isotropic magnetic substance, disposed in planes parallel to the plane of the magnetic film respectively along two other portions of the magnetic film situated on the said projection of the longitudinal axis of the first conductor, on either side of the said projection of the longitudinal axis of the second conductor, said other layers being in contact with said other portions of the magnetic film, or being disposed at a very short distance therefrom, and the surface of contact, or the opposite surface, of said other portions of the magnetic film and of said other layers, having an area which is very much greater than that of any cross-section, along a plane perpendicular to the direction of difficult magnetisation of that part of the magnetic film which is comprised between said other portions of the magnetic film, gaps being provided between adjacent ones of said layers comprised in said memory element.

3. A memory element according to claim 2, wherein the magnetic film is cut into the form of a cross having four arms of which two are parallel to the direction of easy magnetisation and of which the other two are parallel to the direction of difficult magnetisation, said magnetic layers comprised in said memory element being disposed along the respective ends of said arms.

References Cited

UNITED STATES PATENTS

| | | | |
|---|---|---|---|
| 3,092,813 | 6/1963 | Broadbent | 340—174 |
| 3,399,396 | 8/1968 | Rogers | 340—173.1 |

OTHER REFERENCES

IBM Technical Disclosure Bulletin, "Memory Device," by Felton et al., page 10, vol. 6, No. 1, June 6, 1963 copy in 340–174.

International Solid-State Circuits Conference; Session I: Digital Memories; "The Waffle Iron Stove," by Finch et al.; pages 12 and 13 copy in 340–174. Feb. 20, 1963.

IEEE Transactions On Magnetics, "A Read Only 70–NS Waffle Iron Memory," by Aviles et al., vol. Mag.–3, No. 3, September 1967, pages 321–324, copy in 340–173.

STANLEY M. URYNOWICZ, Jr., Primary Examiner